United States Patent [19]
Kubo et al.

[11] Patent Number: 6,091,467
[45] Date of Patent: Jul. 18, 2000

[54] LIQUID CRYSTAL DISPLAY APPARATUS AND METHOD OF MANUFACTURING SAME

[75] Inventors: Masumi Kubo, Nara; Katsuhiro Kawai, Kashihara; Shinya Yamakawa, Ikoma; Masaya Okamoto, Kyoto, all of Japan

[73] Assignee: Sharp Kabushiki Kaisha, Osaka, Japan

[21] Appl. No.: 08/887,968

[22] Filed: Jul. 3, 1997

[30] Foreign Application Priority Data

Jul. 3, 1996 [JP] Japan .................................. 8-173839

[51] Int. Cl.⁷ .......................... G02F 1/136; G02F 1/1343
[52] U.S. Cl. .............................................. 349/44; 349/111
[58] Field of Search ................................. 349/42, 43, 44, 349/110, 111

[56] References Cited

U.S. PATENT DOCUMENTS

| | | | |
|---|---|---|---|
| 4,759,610 | 7/1988 | Yanagisawa | 349/111 |
| 5,414,547 | 5/1995 | Matsuo et al. | 349/44 |
| 5,446,562 | 8/1995 | Sato | 349/42 |
| 5,508,765 | 4/1996 | Nakagawa et al. | 257/59 |
| 5,608,556 | 3/1997 | Koma | 349/42 |
| 5,641,974 | 6/1997 | den Boer et al. | 349/138 |
| 5,771,083 | 6/1998 | Fujihara et al. | 349/39 |
| 5,859,683 | 1/1999 | Tagusa et al. | 349/39 |

FOREIGN PATENT DOCUMENTS

6-130416  5/1994  Japan .

*Primary Examiner*—William L. Sikes
*Assistant Examiner*—Tai V. Duong
*Attorney, Agent, or Firm*—Nixon & Vanderhye, P.C.

[57] ABSTRACT

An object of the present invention is to attain proper display free from improper display conditions, such as crosstalk, improper contrast and uneven display. Another object is to obtain a high aperture ratio by reducing a margin for bonding. Light shielding films are used to cover the overlap portion of the source electrode and the semiconductor layer and the overlap portion of the drain electrode and the semiconductor layer of a bottom gate type TFT device, such as a staggered type. This structure can suppress off-current due to light leakage, and can prevent deterioration of display quality.

27 Claims, 10 Drawing Sheets

LIQUID CRYSTAL DISPLAY APPARATUS AND METHOD OF MANUFACTURING SAME

BACKGROUND OF THE INVENTION

1. Field of the Invention

The present invention relates to a liquid crystal display apparatus and a production method therefor.

2. Description of the Related Art

Figure 9:
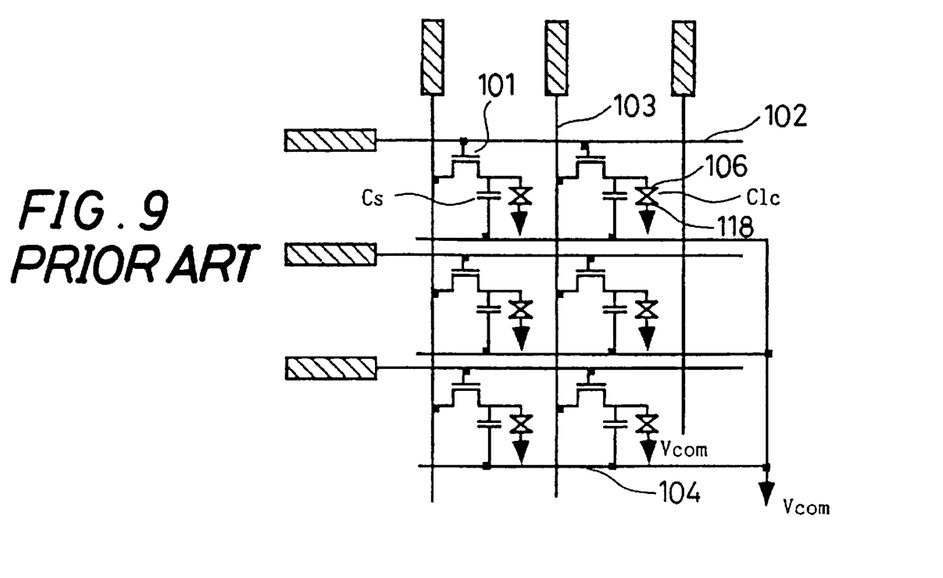
FIG. 9 is an equivalent circuit diagram for a conventional active matrix substrate.

FIG. 9 shows an example of an equivalent circuit of an active matrix liquid crystal display apparatus configured by using thin-film transistors (hereinafter referred to as "TFT") as conventional switching devices, that is, an equivalent circuit referred to as "Cs on Common system." Pixel electrodes 106 are formed in a matrix shape. A TFT device 101 used as a switching device, is connected to each of the pixel electrodes 106. A gate line 102 used as a scanning line is connected to the gate electrode of the TFT device 101. The TFT device 101 is driven by a gate signal supplied to the gate electrode. In addition, a source line 103 used as a signal line is connected to the source electrode of the TFT device 101. When the TFT device 101 is driven, a data (display) signal is supplied to the pixel electrode 106. The gate lines 102 and the source lines 103 are provided around the pixel electrodes 106 arranged in a matrix shape so as to intersect with one another at right angles. Furthermore, the drain electrode of the TFT device 101 is connected to the pixel electrode 106 and an additional capacitance (Cs in FIG. 9). The electrode opposite to the additional capacitance is connected to a common line 104 (hereinafter referred to as "Cs line"). This configuration is used to drive liquid crystal (C1c in FIG. 9) disposed between an counter electrode 118 and the pixel electrode 106.

Figure 10:
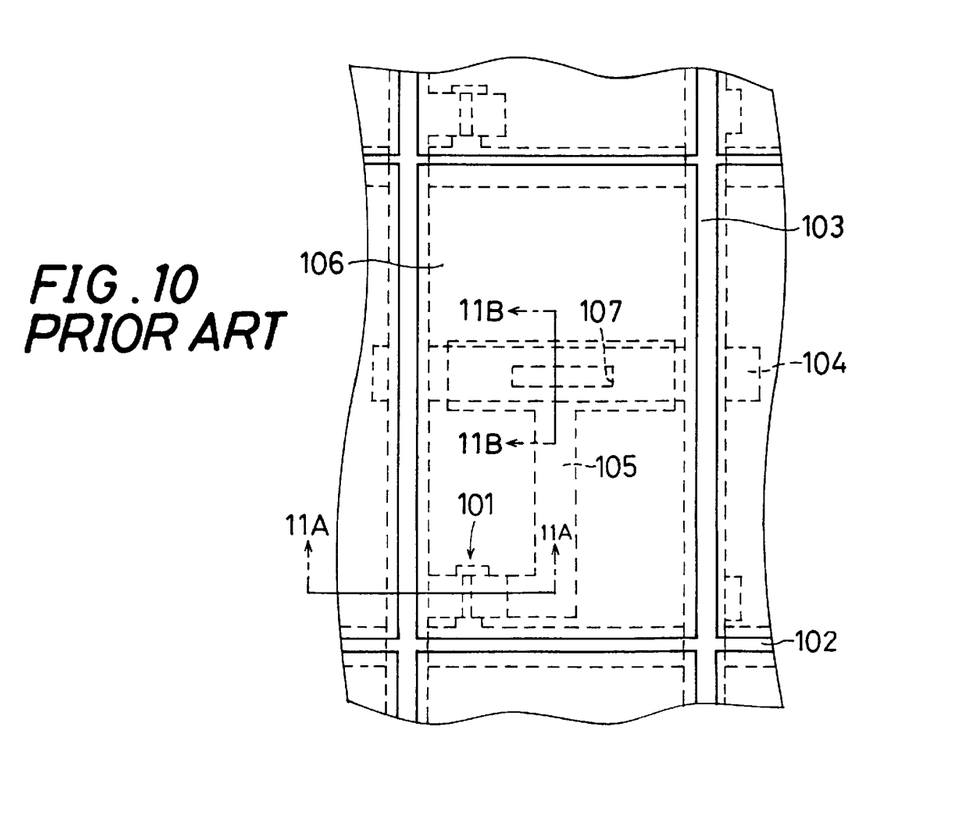
FIG. 10 is a plan view showing a pixel of the conventional active matrix substrate.

FIG. 10 is a plan view showing a pixel of an active matrix substrate of a conventional liquid crystal display apparatus. In FIG. 10, the gate lines 102 and the source lines 103 shown in FIG. 9 are formed on a transparent substrate so as to intersect with one another at right angles. Near each intersection, the TFT device 101 is formed as a switching element. A contact hole 107 provided in an inter-layer insulation layer (not shown) is connected to the pixel electrode 106 via a connection line 105. The connection line 105 is overlapped with the Cs line 104 via a gate insulation film (not shown) so as to form an additional capacitance. Moreover, the pixel electrode 106 partially overlaps with the gate line 102 and the source line 103 via the inter-layer insulation layer.

Figure 11A:
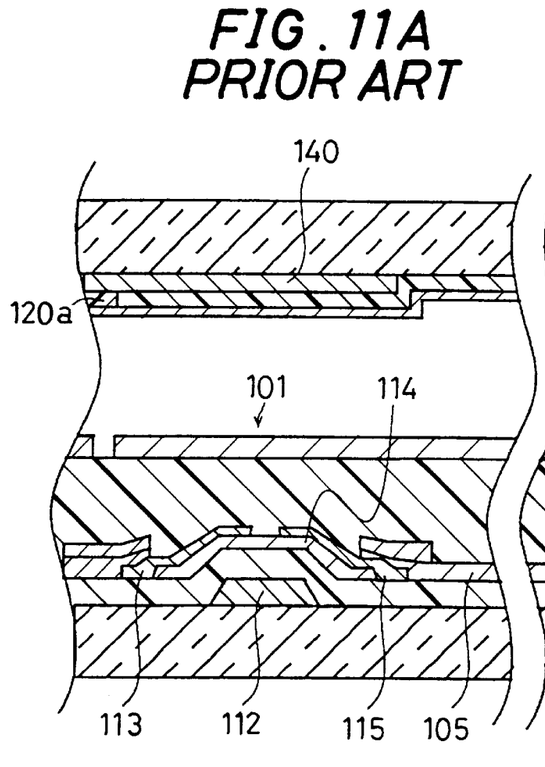
FIGS. 11A and 11B are sectional views of the liquid crystal display apparatus shown in FIG. 10.
Figure 11B:
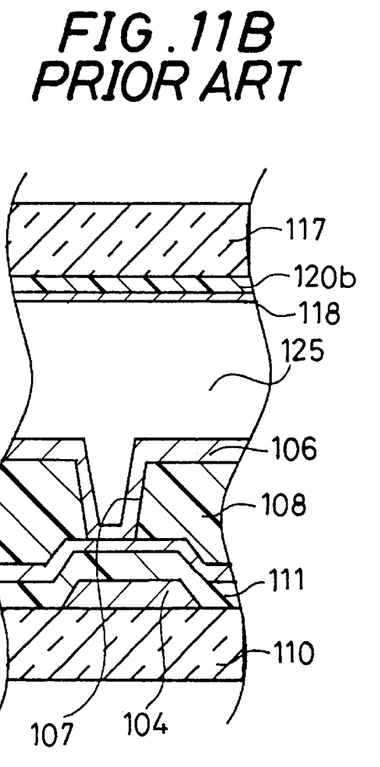

FIGS. 11A and 11B are sectional views of the liquid crystal display apparatus shown in FIG. 10. Referring to FIGS. 11A and 11B, the gate line 102 shown in FIG. 10 and a gate electrode 112 are formed from tantalum, aluminum or the like on a transparent substrate 110, such as a glass substrate, in the first place. A Cs line 104 is formed together with the gate line 102 and the gate electrode 112, a gate insulation film 111 is formed from silicon nitride, silicon oxide or the like, a semiconductor layer 114 is formed from amorphous silicon, polysilicon or the like, and an n+ silicon layers for forming a source electrode 113 and a drain electrode 115 is formed in this sequence.

Next, a transparent conductive film and a metallic film formed from tantalum, aluminum or the like for forming a source line 103 and a connection line 105 are formed in this sequence by the sputtering method so as to perform patterning in predetermined shapes. Over the formed films, an photosensitive acrylic resin having a dielectric constant of 3.4 is formed as an inter-layer insulation film 108, for example, at a film thickness of 3 μm by the spin coating method. This resin is exposed to light in accordance with a desired pattern and subjected to development by using an alkaline solution. As a result, only the exposed portions are etched by the alkaline solution, whereby contact holes 107 passing through the inter-layer insulation film 108 are formed.

Furthermore, on top of the film, a transparent conductive film, for forming a pixel electrode 106 is formed by the sputtering method and is subjected to patterning. As a result, the pixel electrode 106 is connected to the connection line 105, which is connected to the drain electrode 115 of the TFT device 101, via the contact hole 107 passing through the inter-layer insulation film 108. This completes the production of an active matrix substrate.

On the other hand, three-color (red, green and blue) filters 120a, 120b (only two color filters are shown in FIGS. 11A and 11B) and counter electrodes 118 are formed on a transparent substrate 117, such as a glass substrate. Liquid crystal 125 is disposed between such an opposing substrate and the above-mentioned active matrix substrate, and bonded together by using a sealing agent (not shown). In order to prevent light leakage from the TFT device, a light shielding film 140 is provided on the opposing substrate disposed above the TFT device 101. Furthermore, an alignment film (not shown) and a polarizing plate (not shown) are used as necessary.

With this structure, the aperture ratio of the liquid crystal display apparatus can be raised, and electric fields caused by the lines 102, 103 are shielded, thereby making it possible to suppress disclination.

Figure 12:
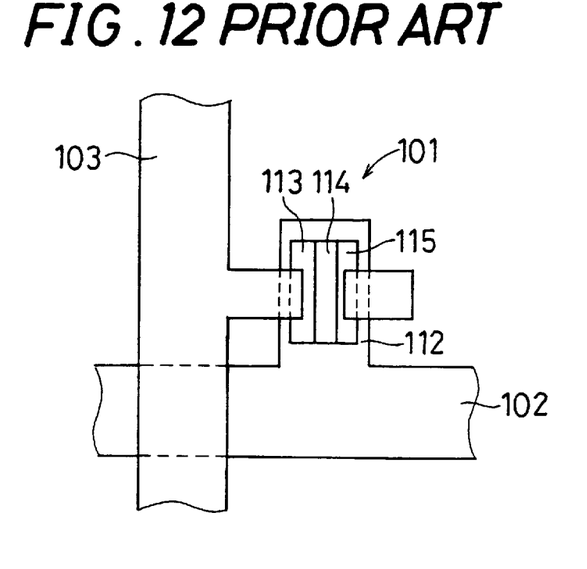
FIG. 12 is a magnified plan view of a TFT device on the conventional active matrix substrate.

FIG. 12 is a magnified plan view of a TFT device on the active matrix substrate shown in FIGS. 10 and 11A. Referring to FIG. 12, the semiconductor layer 114 is provided on the gate electrode 112 branched from the gate line 102 via a gate insulation film (not shown). On top of the layer, an n+ silicon layer for forming the source electrode 113 and the drain electrode 115 is provided via a predetermined gap. The source line 103 used as a data signal line is connected to the source electrode 113 at a portion branched from the source line 103. In addition, the connection line 105 (not shown) is connected to the drain electrode 115.

Generally, in order to accomplish color display in the liquid crystal display apparatus, color filters are formed on the opposing substrate, and in order to prevent color mixture and light leakage, a light shielding film being referred to as "black matrix" is formed between the pixel electrodes 106 and at a portion opposite to the TFT device 101. However, a structure without a black matrix on the opposing substrate has been contrived in order to lower product ion cost.

In this case, light shielding between pixel electrodes 106 can be attained at the lines 102, 103, but not at the upper portion of the TFT device. In the case of a switching device such as a TFT device comprising a semiconductor layer, carriers are generated when the semiconductor layer is exposed to light, and off-current increases, causing crosstalk, improper contrast and uneven display, and significantly deteriorating display quality. This is caused by the reason described below. That is, in case the inter-layer insulation film 108 is provided on a TFT device, in particular, in case a thick resin film is formed, display is apt to be affected by stray light.

An active matrix liquid crystal display apparatus in accordance with another prior art has also been disclosed in Japanese Unexamined Patent Publication JP-A 6-130416 (1994), for example. This publication discloses a structure wherein a light shielding film is formed on the side of an active matrix substrate or an opposing substrate.

Figure 13:
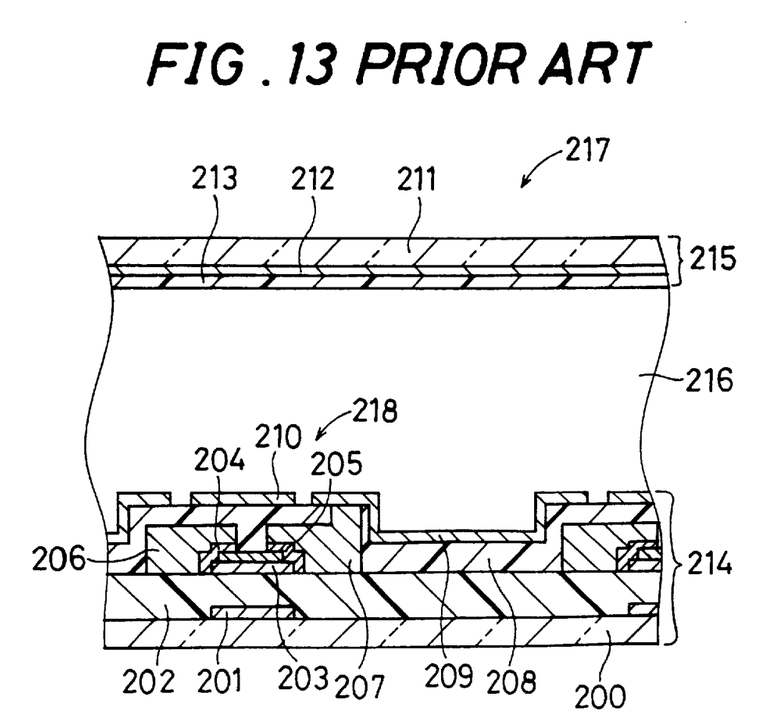
FIG. 13 is a sectional view showing another conventional liquid crystal display apparatus.

FIG. 13 is a sectional view showing an active matrix type liquid crystal display apparatus 217 disclosed in Japanese Unexamined Patent Publication JP-A 6-130416 (1994). In the liquid crystal display apparatus 217, a light shielding film is provided on the side of the active matrix substrate. In the liquid crystal display apparatus 217, a liquid crystal layer 216 is disposed between an active matrix substrate 214 and an opposing substrate 215.

The active matrix substrate 214 is formed as described below. Gate lines, which have a plurality of gate electrodes 201 on one of the surfaces of the transparent substrate 200 on the side of the liquid crystal layer 216, are formed in parallel with one another. A plurality of source lines are formed in parallel with one another in the direction orthogonal to the gate lines. Pixel electrodes 209 and TFT devices 218 are formed at a plurality of regions surrounded by the gate lines and the source lines intersecting with one another.

In the TFT device 218, the gate electrode 201 is covered with the gate insulation film 202, a non-dope a-Si layer 203 is provided on the gate insulation film 202, and N+ type a-Si layers 204, 205 are provided on the a-Si layer 203. A source electrode 206, to which the source line is connected, is provided on one of the N+ type a-Si layers, that is, 204. Furthermore, a drain electrode 207, to which the pixel electrode 209 is connected, is provided on the other N+ type a-Si layer, that is, 205. The TFT device 218 is connected to the pixel electrode 209 via the drain electrode 207. However, an inter-layer insulation film 208 is disposed at portions other than the drain electrode 207. Moreover, a Light shielding film 210 is provided on the TFT device 218 via the inter-layer insulation film 208.

The opposing substrate 215 is formed as described below. An counter electrode 212 opposite to the pixel electrode 209 is formed on one of the surfaces of the transparent substrate 211 on the side of the liquid crystal layer 216, and an alignment film 213 is formed to cover the counter electrode 212.

In this kind of structure having the light shielding film 210 via the inter-layer insulation film 208, when light enters from the side of the opposing substrate 215, it is possible to prevent light from entering the a-Si layers 203, 204 and 205 of the TFT device 218. However, when light enters from the side of the active matrix substrate 214, carriers are generated by the light reflected by the light shielding film 210, and display quality is deteriorated.

SUMMARY OF THE INVENTION

Hence an object of the present invention is to provide a liquid crystal display apparatus capable of being attained at low production cost without deteriorating display quality, and to provide a production method therefor.

The invention provides a liquid crystal display apparatus comprising an active matrix substrate in which a transistor device is provided near an intersection of a scanning line and a signal line, and the scanning line, the signal line, and a pixel electrode is connected to a gate electrode, a source electrode and a drain electrode of the transistor device, respectively; and an opposing substrate in which a counter electrode is formed, the opposing substrate being opposed to the active matrix substrate via liquid crystal; wherein light is shielded at least at an overlap portion of the source electrode and the semiconductor layer of the transistor device and at an overlap portion of the drain electrode and the semiconductor layer.

This structure can prevent the generation of carriers at the overlap portion of the source electrode and the semiconductor layer and the overlap portion of the drain electrode and the semiconductor layer of the transistor device due to external light, such as sunlight, applied to the transistor devices, stray light from back light, or light from a light source when the liquid crystal display apparatus is used as a projection type. The structure can also suppress increase in light off-current. It thus possible to obtain proper display free from crosstalk, improper contrast and uneven display. In addition, by providing the light shielding films on the active matrix substrate side, bonding can be done without considering accuracy, and light shielding can be attained only at portions required to be shielded, whereby the aperture ratio can be raised.

A pattern for shielding the overlap portion of the semiconductor layer and the source electrode of the transistor portion and the overlap portion of the semiconductor and the drain electrode of the transistor device from light may be the same as the film for forming the signal lines.

Since this structure requires no need to form a new light shielding film, the number of processing steps can be reduced.

The pixel electrodes are formed so as to overlap with the scanning and signal lines via an inter-layer insulation film. It may be not required that a light shielding film is formed on the opposing substrate.

With this structure, light shielding can be performed on the side of the active matrix substrate, the aperture ratio can be raised, end the production cost can be reduced.

The invention provides a liquid crystal display apparatus comprising an active matrix substrate, an opposing substrate, and liquid crystal disposed between the two substrates, wherein the active matrix substrate includes:
  a transparent substrate,
  a plurality of scanning lines formed on one surface of the transparent substrate, the one surface being on the side of the opposing substrate,
  a plurality of signal lines formed in the direction orthogonal to the scanning lines, on the one surface of the transparent substrate while maintaining insulation,
  pixel electrodes disposed in a plurality of regions surrounded by the scanning and signal lines intersecting with one another, and
  transistor devices provided in the regions, each including a gate electrode connected to the scanning lines, a gate insulation film covering the gate electrode, a semiconductor layer provided on the gate insulation film, a source electrode provided on the semiconductor layer and connected to the signal line, and a drain electrode provided on the semiconductor layer and connected to the pixel electrode, and the opposing substrate includes:
  a transparent substrate, and
  a counter electrode formed on one surface of the transparent substrate on the side of the active matrix substrate,
the liquid crystal display apparatus comprising light shielding films covering at least an overlap portion of the semiconductor layer and the source electrode of the transistor device and an overlap portion of the semiconductor layer and the drain electrode of the transistor device to shield light incident the transistor device.

In accordance with the present invention, generation of carriers at the overlap portion of the semiconductor layer and the source electrode of the transistor device and the overlap portion of the semiconductor layer and the drain electrode of the transistor device can be prevented, whereby increase in the light off-current can be suppressed to improve display quality.

The present invention is also characterized in that the light shielding films are provided on the active matrix substrate side.

In accordance with the present invention, by providing the light shielding films on the active matrix substrate side, bonding to the opposing substrate can be done without accurate control, and light shielding can be attained at minimum regions required to be shielded, whereby the aperture ratio can be raised.

Furthermore, the present invention is characterized in that the light shielding films are provided on the liquid crystal layer side of the transistor device.

In accordance with the present invention, the light shielding films are provided on a liquid crystal layer side of the transistor device on the active matrix substrate side. With this structure, the substrates can be easily bonded to each other, and the aperture ratio can be increased. Furthermore, incident light from the opposing substrate can be shielded.

In the present invention, the active matrix substrate includes:

a first insulation film provided on one surface of the transparent substrate to cover the transistor device, and a second insulation film provided on the first insulation film, and the light shielding films are disposed between the first insulation film and the second insulation film.

In accordance with the present invention, the first insulation film covers the transistor devices, the light shielding films are provided on the first insulation film, the second insulation film is provided on the first insulation film to cover the light shielding films. With this structure, the substrates can be easily bonded to each other, and the aperture ratio can be increased. Furthermore, incident light from the opposing substrate can be shielded.

Furthermore, it is made possible to form pixel electrodes on a surface flattened by the second insulation film. In addition, since the light shielding films are covered with the second insulation film, a highly reliable liquid crystal display apparatus can be attained even if a material containing relatively high amounts of impurities such as an organic material is used. As the light shielding films may be used a film formed of a material having a good light absorbability instead of a metal film, to easily prevent irregular light reflection.

The invention is characterized in that the signal lines function as the light shielding films.

In accordance with the present invention, since the signal lines function as the light shielding films, there is no need to form a new light shielding film, and the structure can be simplified.

The present invention provides a method of manufacturing a liquid crystal display apparatus formed by bonding an active matrix substrate to an opposing substrate and injecting a liquid crystal material between the substrates, the method comprising the steps of:

preparing a transparent substrate to be used as the active matrix substrate, forming a plurality of scanning lines on one surface of the transparent substrate on the liquid crystal layer side, forming a plurality of signal lines in a direction orthogonal to the scanning lines while maintaining insulation, forming a pixel electrode in each of a plurality of regions surrounded by the scanning lines and the signal lines intersecting with one another.

forming a transistor device in each of the regions, comprising a gate electrode connected to the scanning line, a gate insulation film covering the gate electrode, a semiconductor layer provided on the gate insulation film, a source electrode provided on the semiconductor layer and connected to the signal line, and a drain electrode provided on the semiconductor layer and connected to the pixel electrode, each provided in each region, forming a light shielding film on each of the transistor devices to cover at least an overlap portion of the semiconductor layer and the source electrode of the transistor device and an overlap portion of the semiconductor layer and the drain electrode of the transistor device to shield light incident to the transistor device.

In accordance with the present invention, as described above, the light shielding films can be provided on the liquid crystal layer side of the transistor device on the active matrix substrate side. Therefore, the substrates can be easily bonded to each other, the generation of carriers at the overlap portions of the semiconductor layer and the source and drain electrodes of the transistor device can be prevented, increase in the light off-current can be suppressed, and a liquid crystal display apparatus capable of delivering superior display quality can be obtained.

Furthermore, the manufacturing method of the invention comprises the steps of:

forming a first insulation film on one surface of the transparent substrate to cover the transistor devices; and forming a second insulation film on the first insulation film to cover the light shielding films, wherein the light shielding films are formed on the first insulation film.

In accordance with the present invention, as described above, the first insulation film is provided to cover the transistor device, the light shielding films are provided on the first insulation film, and the second insulation film is provided on the first insulation film to cover the light shielding films. Therefore, the substrates can be easily bonded to each other, incident light from the opposing substrate can be shielded, and a liquid crystal display apparatus capable of delivering superior display quality can be obtained.

Furthermore, the invention is characterized in that the signal lines are made of a light shielding material capable of functioning as the light shielding films.

In accordance with the present invention, since the signal lines function as the light shielding films, there is no need to form a new light shielding film, and the number of processing steps can be reduced.

As described above, the liquid crystal display apparatus of the present invention comprises an active matrix substrate having transistor devices near the intersections of scanning lines and signal lines, the gate electrodes, the source electrodes and the drain electrodes of the transistor devices being connected to the scanning lines, the signal lines and pixel electrodes, respectively; an opposing substrate having counter electrodes; and liquid crystal disposed between the active matrix substrate and the opposing substrate, characterized in that light is shielded at least at the overlap portion of the semiconductor layer and the source electrode of the transistor device and the overlap portion of the semiconductor layer and the drain electrode of the transistor device. This structure can prevent the generation of carriers at the overlap portion of the semiconductor layer and the source electrode and the overlap portion of the semiconductor layer and the drain electrode of the transistor device due to external light, such as sunlight, applied to the transistor devices, stray light from back light, or light from a light source when the liquid crystal display apparatus is used as a projection type, and can suppress increase in light off-current. It is thus possible to obtain proper display free from crosstalk, improper contrast and uneven display. In addition, by providing the light shielding films on the active matrix substrate side, bonding to the opposing substrate can be done without considering accuracy, and light shielding can be attained only at portions required to be shielded, whereby the aperture ratio can be raised.

Furthermore, since the pattern for covering the overlap portion of the semiconductor layer and the source electrode and the overlap portion of the semiconductor layer and the drain electrode of the transistor device is the same as the film for forming the signal lines, there is no need to form a new light shielding film, and the number of processing steps can be reduced.

Furthermore, the pixel electrodes are formed to overlap with the scanning and signal lines via the inter-layer insulation film, and no light shielding film is formed on the opposing substrate. Therefore, light shielding can be performed on the side of the active matrix substrate, the aperture ratio can be raised, and production cost can be reduced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

First Embodiment

Figure 1:
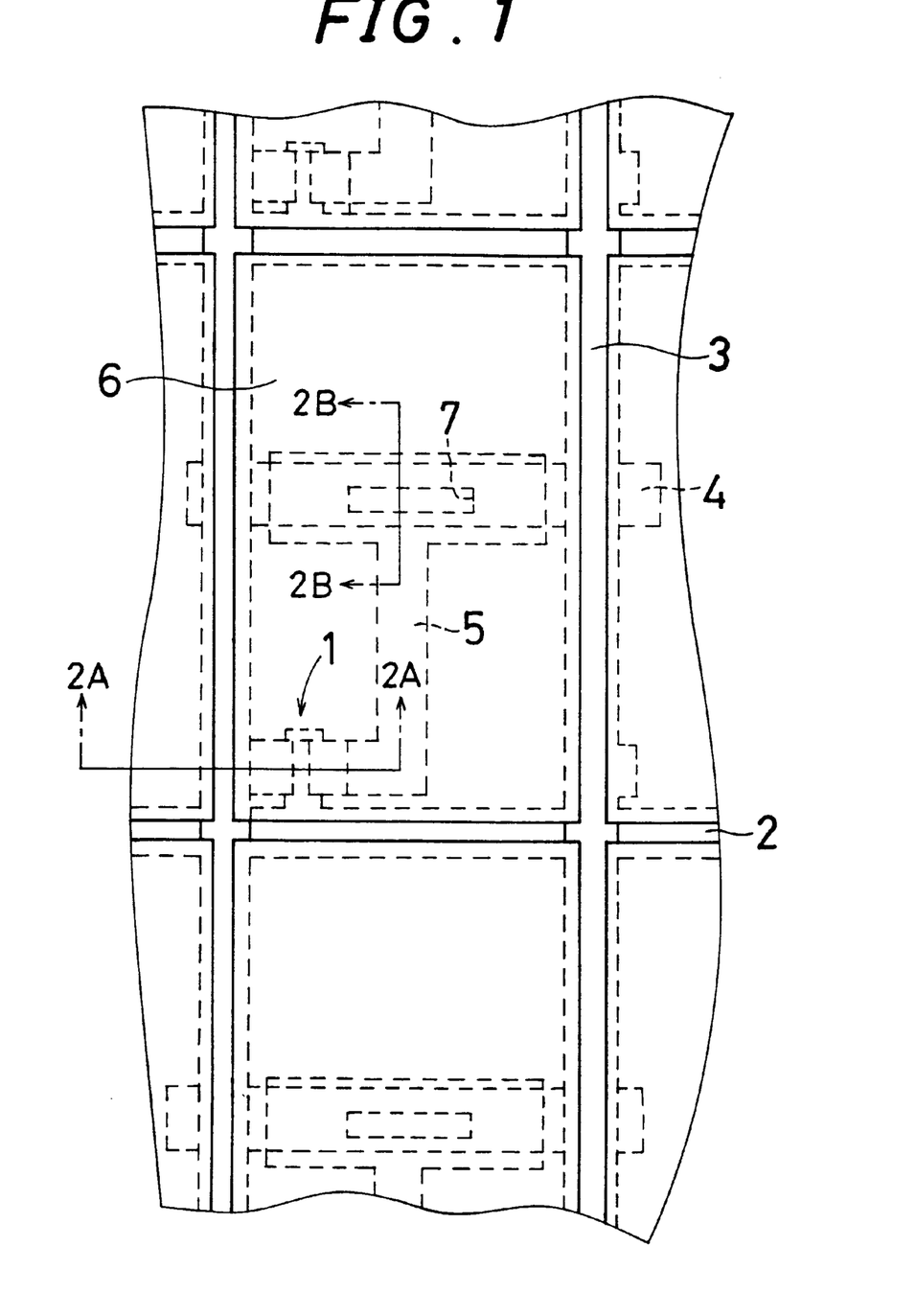
FIG. 1 is a plan view showing a pixel on an active matrix substrate of a first embodiment of the present invention.

FIG. 1 is a plan view showing a structure of a pixel on an active matrix substrate of a liquid crystal display apparatus in accordance with a first embodiment of the present invention. Referring to FIG. 1, a plurality of pixel electrodes 6 are provided in a matrix shape on the active matrix substrate. Gate lines 2 used as scanning lines and source lines 3 used as signal lines are provided so as to intersect with one another at right angles. A Cs line 4 for forming an additional capacitance is provided in parallel with the gate lines 2 and orthogonal to the source lines 3, thereby forming the Cs-on-Common system. Instead of this system, the Cs-on-Gate system, wherein Cs is formed on an adjacent gate line, can also be used. The pixel electrodes 6 adjacent to each other are separated along the gate line 2 in the vertical direction, and also separated along the source line 3 in the horizontal direction. Therefore, light is completely shielded at portions between the pixel electrodes 6, wherein no electric field is applied to the liquid crystal. A TFT device 1 is provided as a switching device connected to the pixel electrode 6 at the intersection of the gate line 2 and the source line 3. The drain electrode of the TFT device 1 is connected to the pixel electrode 6 via a connection line 5 and a contact hole 7.

Figure 2A:
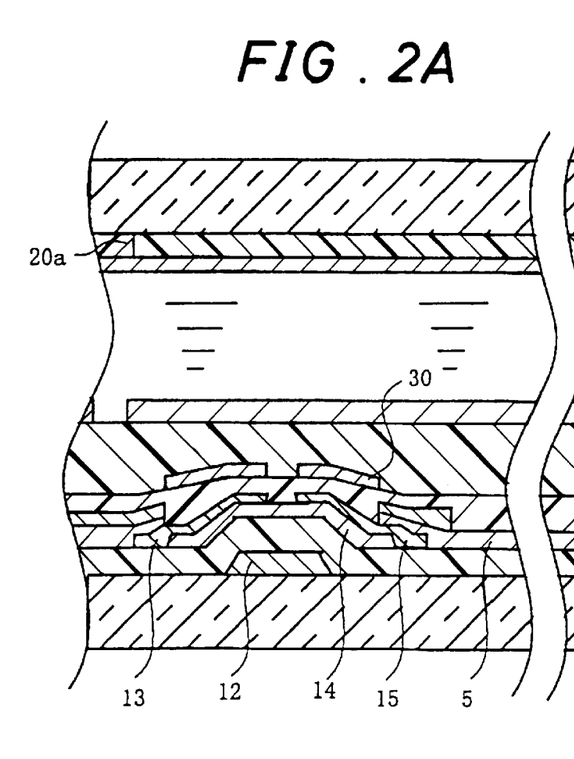
FIGS. 2A and 2B are sectional views of the liquid crystal display apparatus shown in FIG. 1.
Figure 2B:
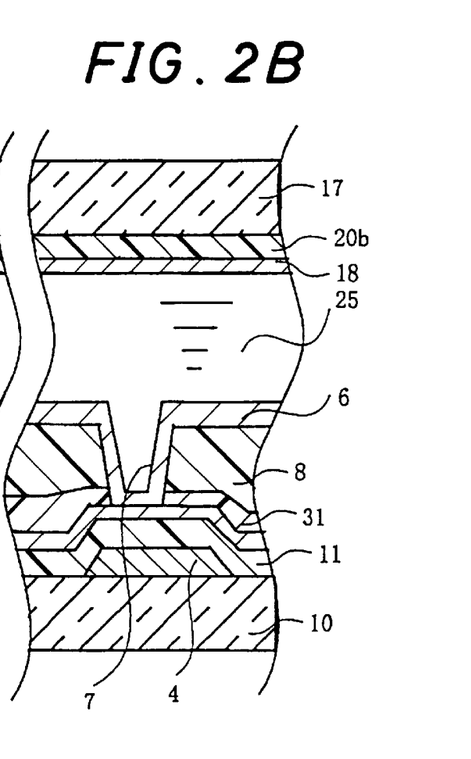
Figure 3A:
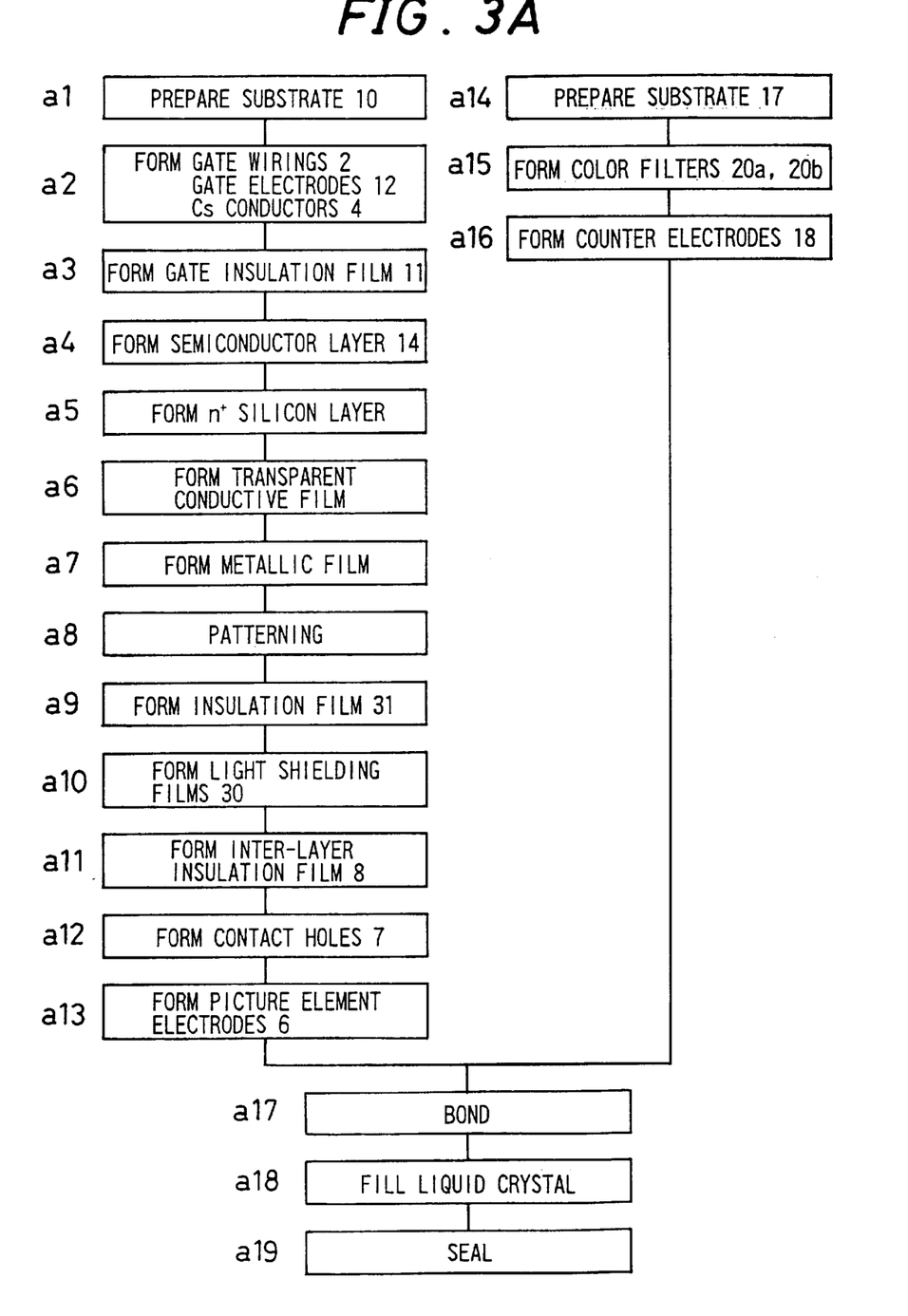
FIG. 3A is a process chart for the liquid crystal display apparatus shown in FIG. 1.

FIGS. 2A and 2B are sectional views of the liquid crystal display apparatus shown in FIG. 1. FIG. 3A is a process chart showing a production method for the liquid crystal display apparatus. Referring to FIGS. 2A and 2B, at step a1, a transparent substrate 10, such as a glass substrate, is prepared in the first place. At step a2, by using tantalum, aluminum or the like, gate lines 2 shown in FIG. 1 and gate electrodes 12 are formed on the substrate 10, and Cs lines 4 are also formed together with the gate lines 2 and the gate electrodes 12 on the substrate 10. At step a3, a gate insulation film 11 is formed from silicon nitride, silicon oxide or the like. At step a4, a semiconductor layer 14 is formed from amorphous silicon, polysilicon or the like. At step a5, an n+ silicon layer for forming source electrodes 13 and drain electrodes 15 is formed. At step a6, a transparent conductive film for forming source lines 3 and connection lines 5 are formed. At step a7, a metallic film formed from tantalum, aluminum or the like is formed. At step a8, these films are shaped into desired patterns.

Next, in the present embodiment, at step 9, an insulation film 31 is formed from silicon nitride, silicon oxide or the like so as to cover at least the upper portion of the TFT device. At step a10, light shielding films 30 are formed on the insulation film 31. A metal, such as aluminum, tantalum or chromium, or a semiconductor, such as Si, or an organic material, such as a colored resin, can be used as a material for the light shielding films 30. At this time, tantalum nitride or a chromium oxide may be formed on the surface of the metallic film as necessary so as to reduce reflection of light.

Furthermore, at step a11, on top of the film, a photosensitive acrylic resin having a dielectric constant of 3.4 is formed at a film thickness of 3 μm for example by the spin coating method as an inter-layer insulation film 8. At step 12, this resin is exposed to light in accordance with a desired pattern, and subjected to development by using an alkaline solution. As a result, only the portions exposed to light are etched by the alkaline solution, and contact holes 7 passing through the inter-layer insulation film 8 are formed. After this, if the insulation film 31 is present under the contact holes 7, the film is removed by etching. If the inter-layer insulation film 8 is used as a mask at this time, the number of process steps can be reduced.

Moreover, at step a13, a transparent conductive film for forming the pixel electrodes 6 are formed by the sputtering method and subjected to patterning. As a result, the pixel electrodes 6 are each connected to the connection line 5 connected to the drain electrode 15 of the TFT device 1 via the contact hole 7 passing through the inter-layer insulation film 8. This completes the production of an active matrix substrate.

On the other hand, at step a14, a transparent substrate 17, such as a glass substrate, is prepared. At step 15, three-color (red, green and blue) filters 20a, 20b (only two color filters are shown in FIGS. 2A and 2B) are formed on the substrate 17. At step a16, opposing counter electrodes 18 are formed. At step a17, the completed opposing substrate is bonded to the active matrix substrate. At step a18, liquid crystal 25 is disposed between these two substrates. At step a19, a liquid crystal sealing port is sealed by using a sealing agent (not shown). An alignment film (not shown) and a polarizing plate (not shown) can also be used for the liquid crystal display apparatus as necessary.

Figure 3B:
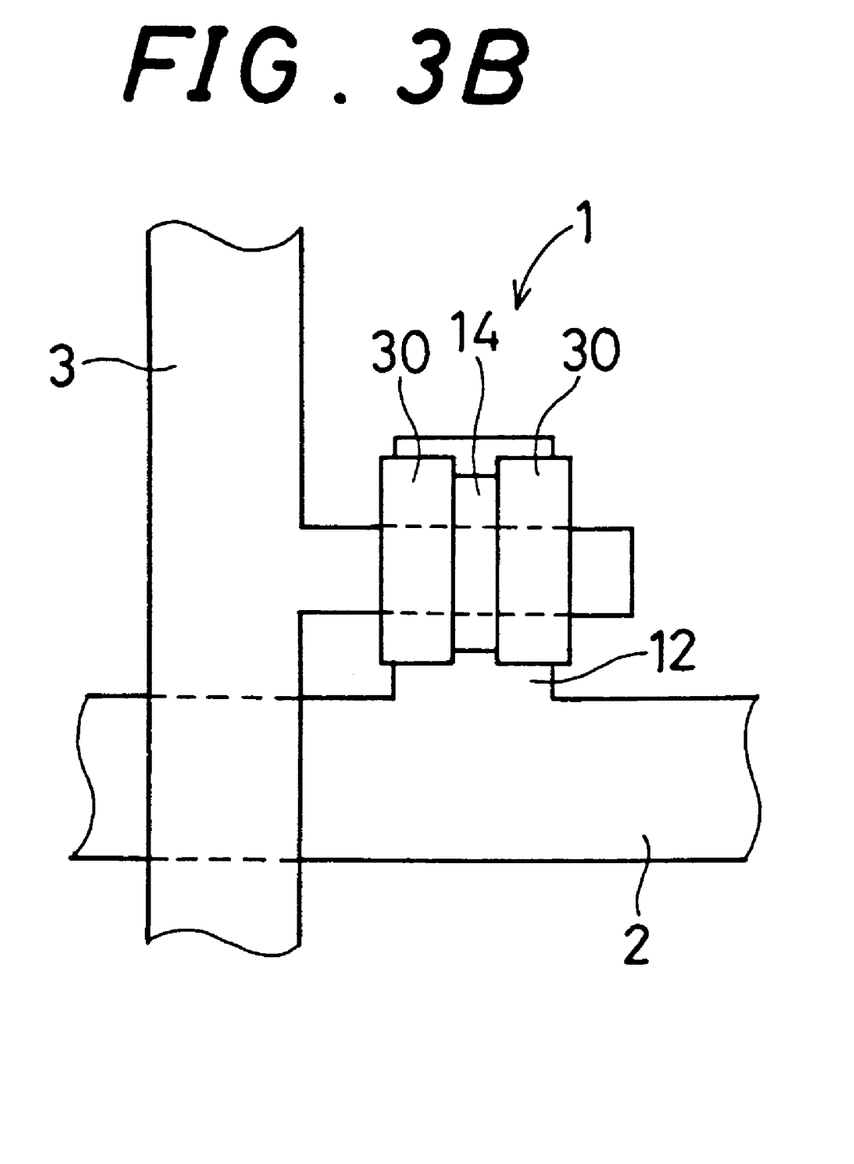
FIG. 3B is a magnified plan view of a TFT device on the active matrix substrate of the first embodiment of the present invention.

FIG. 3B is a magnified plan view of a TFT device on the active matrix substrate shown in FIGS. 1 and 2A. Referring to FIG. 3B, the semiconductor layer 14 is provided on the gate electrode 12 branched from the gate line 2 via a gate insulation film (not shown). On top of the layer, an n+ silicon layer for forming a source electrode (not shown) and a drain electrode (not shown) is provided via a predetermined gap. The source line 3 used as a data signal line is connected to the source electrode 13 at a portion branched from the source line 3. In addition, the connection line 5 is connected to the drain electrode 15.

Furthermore, on the top of the layer, light shielding films 30 are provided via insulation films (not shown). In the present embodiment, the light shielding films 30 are provided so as to cover only the overlap portion of the source electrode 13 and the semiconductor layer 14 and the overlap portion of the drain electrode 15 and the semiconductor layer 14. With this structure, bonding can be done without considering accuracy, and light shielding can be attained only at portions required to be shielded, whereby the aperture ratio can be raised.

Figure 4:
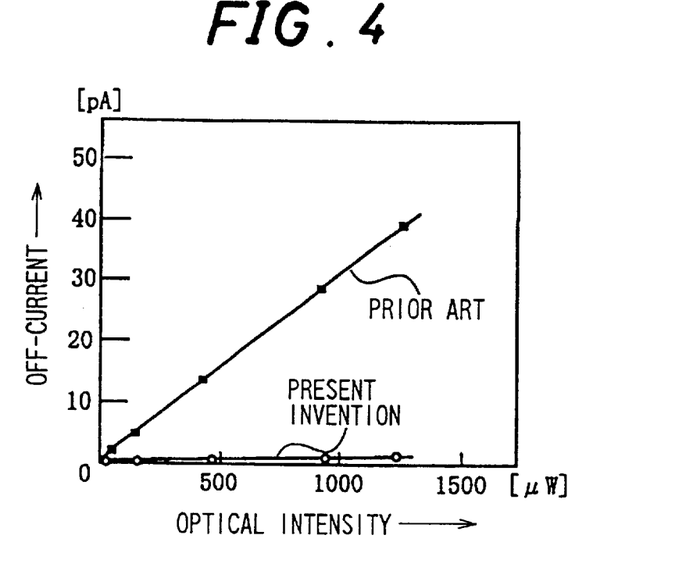
FIG. 4 is a graph showing the off characteristic of the TFT device of the first embodiment of the present invention in comparison with the off characteristic of a conventional TFT device.

FIG. 4 shows the result of a light leakage experiment conducted by actually applying light. The active matrix substrate which is not yet bonded to the opposing substrate was used for this experiment. The experiment was conducted to obtain the relationship between the intensity of light energy and off-current when off-voltage at the gate was −10 V and when the voltage between the source and the drain was 10 V. "Present invention" described in FIG. 4 corresponds to the embodiment shown in FIG. 3B, and "Prior art" shown in FIG. 4 corresponds to the conventional example shown in FIG. 12, having no light shielding film.

As shown in FIG. 4, it was confirmed that the dependence of off-current on optical intensity was improved by an order of magnitude in the structure of the present embodiment in comparison with the conventional structure. As indicated in FIG. 4, if light is not shielded at the overlap portion of the semiconductor layer 14 and the n$^+$-Si layer for forming the source electrode 13 and the drain electrode 15, carriers are generated by the entry of light, causing improper display conditions, such as crosstalk, improper contrast and uneven display, due to increased off-current. Therefore, if a light shielding film is removed only to reduce cost, display quality cannot be maintained. However, since no light is directly applied in the case of the structure of the present invention, carrier generation due to the application of light can be prevented. It is thus possible to obtain proper display free from improper display conditions, such as crosstalk, improper contrast and uneven display. In the experiment, a slight amount of off-current flowed, since the upper portion of a channel (the semiconductor layer 14 not overlapped with the source and drain electrodes 13, 15) was not covered in the case of the present embodiment. However, the current caused no problem during actual visual observation.

Figure 5:
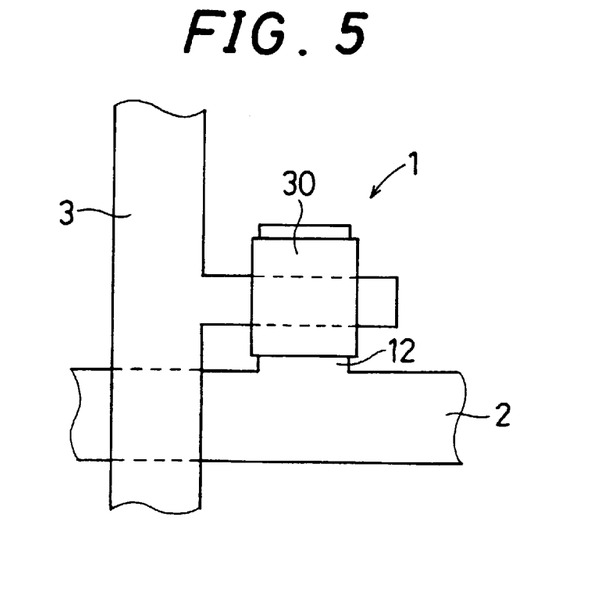
FIG. 5 is a magnified plan view of a TFT device on another active matrix substrate of the first embodiment of the present invention.

When light shielding films 30 are formed so as to cover the upper portion of the channel as shown in FIG. 5, carrier generation due to light at the channel can be suppressed, and the light off-current can be reduced further.

When the liquid crystal display apparatus is used as a light bulb for a projection-type liquid crystal display apparatus, the switching device is much more intensely irradiated with light from a light source in the projection type than in a direct-view type. With the structure of the present invention, the generation of light off-current can be suppressed. As a result, the panel can be irradiated with brighter light, and brighter display can thus be obtained.

Furthermore, in the invention the light shielding films 30 are formed via the insulation film 31, and the pixel electrodes 6 are formed via the inter-layer insulation film 8. It is made possible to form the pixel electrodes 6 on a surface flattened by the inter-layer insulation film 8. In addition, since the light shielding films 30 are covered with the inter-layer insulation film 8, a highly reliable liquid crystal display apparatus can be attained even if a material containing relatively high amounts of impurities such as an organic material is used. As the light shielding films 30 may be used a film formed of a material having a good light absorbability instead of a metal film, to easily prevent irregular light reflection.

Furthermore, for the purpose of avoiding defective display caused by carriers generated by the entering of light incident from the active matrix substrate side into the TFT device 1, it is preferable to employ a material having a relatively low reflectivity for the light shielding films 30.

According to the invention, since the layer where the light shielding films 30 is provided is different from the layer where the pixel electrodes 6 are provided, adverse effects of dusts on the pixel electrodes 6 in forming the light shielding films 30 can be decreased with the result that a yield of good products is enhanced.

Second Embodiment

Figure 6A:
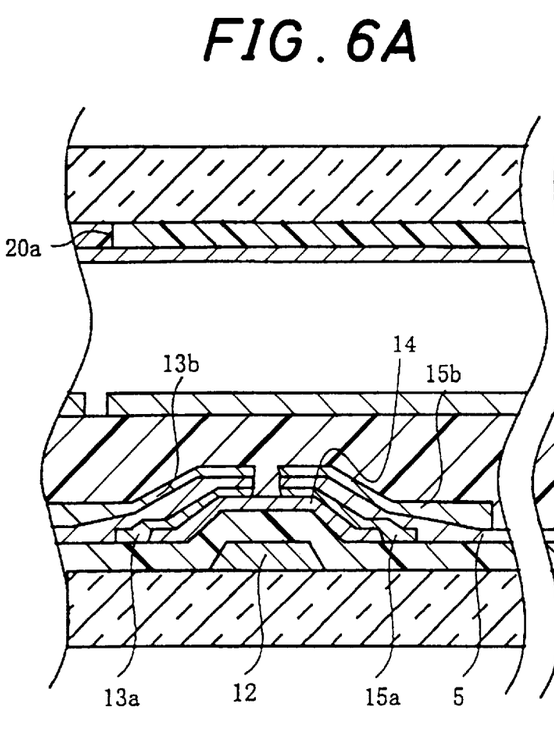
FIGS. 6A and 6B are sectional views of an active matrix substrate of a second embodiment of the present invention.
Figure 6B:
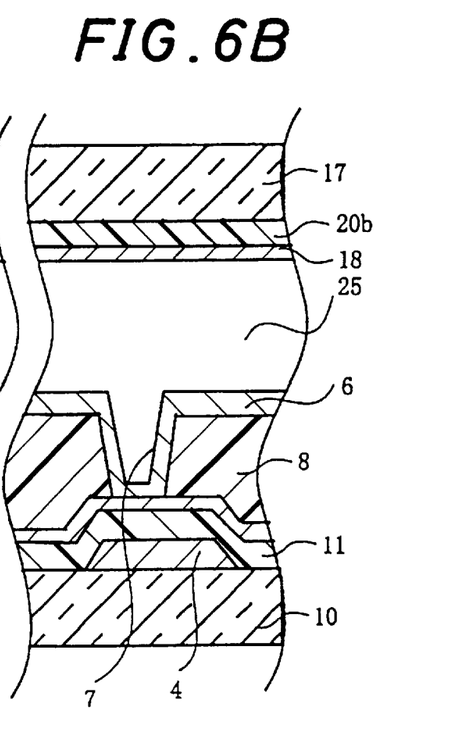
Figure 7:
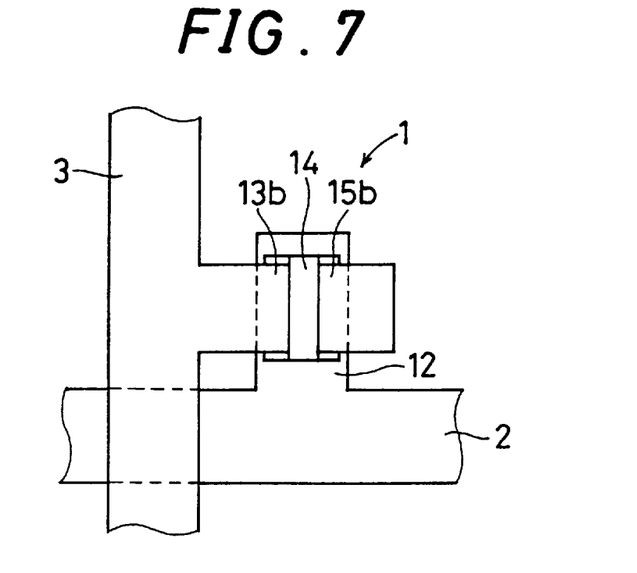
FIG. 7 is a magnified plan view of a TFT device on the active matrix substrate of the second embodiment of the present invention.

FIGS. 6A and 6B are sectional views of a liquid crystal display apparatus in accordance with a second embodiment of the present invention, the device being similar to the liquid crystal display apparatus shown in FIG. 1. FIG. 7 is a magnified plan view of a TFT device on the active matrix substrate shown in FIGS. 1 and 6A. Descriptions for portions identical to those of the first embodiment are omitted.

As shown in FIGS. 6A, 6B and 7, in the present embodiment, instead of the light shielding films 30, light shielding films 13b, 15b made of the same material as that for the source line 3 are former so as to reduce the number of processing steps. The production method for the liquid crystal display apparatus of the present embodiment is the same as that shown in FIG. 3A except that steps a9 and a10 are eliminated.

Referring to FIGS. 6A and 6B, just as in the case of the first embodiment, at step a1, a transparent substrate 10, such as a glass substrate, is prepared. At step a2, gate lines 2 and gate electrodes 12 are formed on the substrate 10, and Cs lines 4 are also formed together with the gate lines 2 and the gate electrodes 12 on the substrate 10. At step a3, a gate insulation film 11 is formed. At step a4, a semiconductor layer 14 is formed. At step a5, an n+ silicon layer for forming a source electrode 13a and a drain electrode 15a is formed. At step a6, a transparent conductive film for forming the source lines 3 and the connection lines 5 is formed. At step a7, a metallic film formed of tantalum, aluminum or the like is formed by the sputtering method. At step a8, these films are shaped into desired patterns.

At this time, in the present embodiment, the formation of a gap between the source electrode 13a and the drain electrode 15a is conducted simultaneously with the formation of a gap between the light shielding films 13b, 15b formed from the same material, such as ITO, metal or the like, as that of the source lines 3. Some formation methods are available. According to one method, the light shielding films 13b, 15b made of metal, ITO or the like are formed, and by using these as masks, the etching of the gap between the n+ silicon layers 13a, 15a is performed. According to the other method, the etching of the gap between the n+ silicon layers 13a, 15a is performed by using a resist which is used when the light shielding films 13b, 15b formed from metal, ITO or the like are etched.

Furthermore, at step a11, on top of the layers, a photosensitive acrylic resin having a dielectric constant of 3.4 is formed at a film thickness of 3 $\mu$m for example by the spin coating method as an inter-layer insulation film 8. At step 12, contact holes 7 are formed in accordance with a desired pattern. At step a13, over the contact holes 7, a transparent conductive film for forming pixel electrodes 6 is formed by the sputtering method, and subjected to patterning. On the other hand, at steps a14 to a16, counter electrodes 18 are formed. The opposing substrate is bonded to the active matrix substrate at step a17. At step a18, liquid crystal 25 is sealed in. At step a19, sealing performed by using a sealing agent (not shown).

In the present embodiment, light leakage was also measured just as in the case of the first embodiment. Values obtained as a result of the measurement were almost the same as those of the present invention shown in FIG. 4. Carrier generation due to light can thus be suppressed, and it is possible to obtain proper display free from improper display conditions, such as crosstalk, improper contrast and uneven display. Just as in the case of the first embodiment, a slight amount of off-current flowed, since the upper portion of the channel (the semiconductor layer 14 not overlapped with the source and drain electrodes 13a, 15a) was not covered. However, the current caused no problem during actual visual observation.

Figure 8:
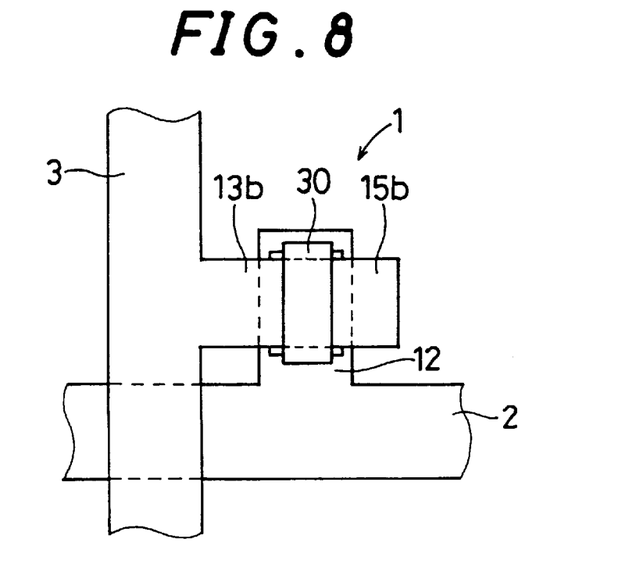
FIG. 8 is a magnified plan view of a TFT device on another active matrix substrate of the second embodiment of the present invention.

When a light shielding film 30 is formed so as to cover the upper portion of the channel as shown in FIG. 8, carrier generation due to light at the channel can be suppressed, and the light off-current can be reduced further. Since the production process for the present embodiment is almost the same as that for the first embodiment, the production process is not described.

The embodiments of the present invention have been described above referring to the drawings. However, the invention is not limited to these embodiments, but can be modified variously.

For example, if the n+ silicon layer for forming the source and drain electrodes comprises two layers of minute crystal of $n^+$ Si and $n^+$a-Si, the on-characteristic con be improved and the off-current can be reduced. This further enhances picture quality.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising an active matrix substrate, an opposing substrate, and liquid crystal disposed between the two substrates, wherein the active matrix substrate includes:
a transparent substrate,
a plurality of scanning lines formed on one surface of the transparent substrate, the one surface being on the side of the opposing substrate,
a plurality of signal lines formed in the direction orthogonal to the scanning lines, on the one surface of the transparent substrate while maintaining insulation,
pixel electrodes disposed in a plurality of regions surrounded by the scanning and signal lines intersecting with one another, and
transistor devices provided in the regions, each including a gate electrode connected to the scanning lines, a gate insulation film covering the gate electrode, a semiconductor layer provided on the gate insulation film, a source electrode provided on the semiconductor layer and connected to the signal line, and a drain electrode provided on the semiconductor layer and connected to the pixel electrode.
wherein the opposing substrate includes:
a transparent substrate, and
a counter electrode formed on one surface of the transparent substrate on the side of the active matrix substrate,
the liquid crystal display apparatus comprising light shielding films covering at least an overlap portion of the semiconductor layer and the source electrode of the transistor devices and an overlap portion of the semiconductor layer and the drain electrode of the transistor devices to shield light incident to the transistor devices, but not covering a channel region.

2. The liquid crystal display apparatus of claim 1, wherein the light shielding films are provided on the active matrix substrate.

3. The liquid crystal display apparatus of claim 1, wherein the light shielding films are provided on a liquid crystal layer side of the transistor devices.

4. The liquid crystal display apparatus of claim 1, further comprising:
another insulation film provided on one surface of the transparent substrate to cover the transistor device and upon which the light shielding films are formed.

5. The liquid crystal display apparatus of claim 1, wherein the signal lines comprise the light shielding films.

6. The liquid crystal display apparatus of claim 1, wherein the light shielding film is formed only over the transistor device (1) along an overlap portion of the source electrode and the semiconductor layer, and (2) along in overlap portion of the drain electrode and the semiconductor layer.

7. The liquid crystal display apparatus of claim 1, wherein no light shielding film is formed on the opposing substrate.

8. The liquid crystal display apparatus of claim 6, wherein no light shielding film is formed on the opposing substrate.

9. The liquid crystal display apparatus of claim 1, wherein the light shielding film is formed of a conductive material.

10. A method of manufacturing a liquid crystal display apparatus formed by bonding an active matrix substrate to an opposing substrate and injecting a liquid crystal material between the substrates, the method comprising the steps of:

preparing a transparent substrate to be used as the active matrix substrate, forming a plurality of scanning lines on one surface of the transparent substrate on the liquid crystal layer side, forming a plurality of signal lines in a direction orthogonal to the scanning lines while maintaining insulation, forming a transistor device comprising a gate electrode connected to the scanning line, a gate insulation film covering the gate electrode, a semiconductor layer provided on the gate insulation film, a source electrode provided on the semiconductor layer and connected to the signal line, and a drain electrode, forming a light shielding film on each of the transistor devices to cover at least an overlap portion of the semiconductor layer and the source electrode of the transistor device and an overlap portion of the semiconductor layer and the drain electrode of the transistor device to shield light incident to the transistor device, but not on a channel region;

forming an insolation film over the light shielding film;

forming a pixel electrode over the insulation film.

11. The method of manufacturing a liquid crystal display apparatus of claim 10, the method comprising the step of:

forming another insulation film to cover the transistor devices, the transistor devices residing under the light shielding film.

12. The method of manufacturing a liquid crystal display apparatus of claim 10, wherein the signal lines are made of light shielding material capable of functioning as the light shielding film.

13. The liquid crystal display apparatus of claim 10, wherein the light shielding film is formed only over the transistor device (1) along an overlap portion of the source electrode and the semiconductor layer, and (2) along an overlap portion of the drain electrode and the semiconductor layer.

14. The liquid crystal display apparatus of claim 10, wherein the light shielding film is formed of a conductive material.

15. A liquid crystal display apparatus comprising:

an active matrix substrate in which a transistor device is provided near an intersection of a scanning line and a signal line; the transistor device having a gate electrode, a source electrode, and a drain electrode; the gate electrode being separated by a semiconductor layer from the source electrode and the drain electrode; the scanning line, the signal line, and a pixel electrode being respectively connected to the gate electrode, the source electrode, and the drain electrode;

a light shielding film formed over the transistor device at least (1) along an overlap portion of the source electrode and the semiconductor layer, and (2) along an overlap portion of the drain electrode and the semiconductor layer, but not over a channel region;

an insulation film formed over the light shielding film; and an opposing substrate, the opposing substrate and the active matrix substrate situated in opposing relation to have a liquid crystal interposed therebetween.

16. The liquid crystal display apparatus of claim 15, wherein the light shielding film is used as a mask for at least partially forming the source electrode and the drain electrode.

17. The liquid crystal display apparatus of claim 15 wherein no light shielding film is formed on the opposing substrate.

18. The liquid crystal display apparatus of claim 16, wherein no light shielding film is formed on the opposing substrate.

19. The liquid crystal display apparatus of claim 15, wherein the light shielding film is formed only over the transistor device (1) along an overlap portion of the source electrode and the semiconductor layer, and (2) along an overlap portion of the drain electrode and the semiconductor layer.

20. The liquid crystal display apparatus of claim 15, wherein no light shielding film is formed on the opposing substrate.

21. The liquid crystal display apparatus of claim 19, wherein no light shielding film is formed on the opposing substrate.

22. The liquid crystal display apparatus of claim 15, wherein the light shielding film is formed of a conductive material.

23. A liquid crystal display apparatus comprising:

an active matrix substrate in which a transistor device is provided near an intersection of a scanning line and a signal line; the transistor device having a gate electrode, a source electrode, and a drain electrode; the gate electrode being separated by a semiconductor layer from the source electrode and the drain electrode; the scanning line, the signal line, and a pixel electrode being respectively connected to the gate electrode, the source electrode, and the drain electrode;

a light shielding film formed over the transistor device at least (1) along an overlap portion of the source electrode and the semiconductor layer, and (2) along an overlap portion of the drain electrode and the semiconductor layer;

an insulation film formed over the light shielding film; and wherein the pixel electrode is formed over the insulation film and covers the light shielding film;

an opposing substrate, the opposing substrate and the active matrix substrate situated in opposing relation to have a liquid crystal interposed therebetween.

24. A liquid crystal display apparatus comprising:

an active matrix substrate in which a transistor device is provided near an intersection of a scanning line and a signal line;

the transistor device having a gate electrode, a source electrode, and a drain electrode;

the gate electrode being separated by a semiconductor layer from the source electrode and the drain electrode;

the scanning line, the signal line, and a pixel electrode being respectively connected to the gate electrode, the source electrode, and the drain electrode;

the source electrode and the gate electrode being respectively formed of an n+ silicon layer;

an overlap region of a light shielding film with the source electrode being overlaid on an overlap region of the source electrode with the semiconductor layer, the overlap region of the light shielding film with the source electrode being identical in form with the overlap region of the source electrode with the semiconductor layer;

an overlap region of a light shielding film with the drain electrode being overlaid on an overlap region of the drain electrode with the semiconductor layer, the overlap region of the light shielding film with the drain electrode being identical in form with the overlap region of the drain electrode with the semiconductor layer; and an opposing substrate, the opposing substrate and the active matrix substrate in opposing relation to have a liquid crystal interposed therebetween.

25. The liquid crystal display apparatus according to claim 24, wherein the light shielding film is formed of a conductive material.

26. The liquid crystal display apparatus according to claim 24, wherein the light shielding film is laminated on the source electrode and the drain electrode.

27. The liquid crystal display apparatus according to claim 24, wherein the semiconductor layer, the source and drain electrodes, and the light shielding film are laminated in this order.

* * * * *